United States Patent Office 3,694,406
Patented Sept. 26, 1972

---

3,694,406
PREPARATION OF POLYOXAZOLIDONES
Gaetano F. D'Alelio, South Bend, Ind., assignor to the United States of America as represented by the Secretary of the Air Force
No Drawing. Filed July 31, 1970, Ser. No. 60,141
Int. Cl. C08g *30/04*
U.S. Cl. 260—47 EP                   9 Claims

ABSTRACT OF THE DISCLOSURE

A process for preparing polyoxazolidones is provided in which a polyepoxide is reacted with a polyisocyanate in the presence of a catalytic amount of an organic phosphonium halide. The polymer products so produced can be used in a variety of applications, such as coatings, castings, molding compositions, adhesives, filament winding, sealant and calking compounds, potting compounds, impregnating compounds, and the like.

FIELD OF THE INVENTION

This invention relates to a process for the preparation of polyoxazolidones. In one aspect it relates to a novel catalyst for use in the polycondensation of a polyepoxide and a polyisocyanate.

BACKGROUND OF THE INVENTION

The preparation of polyoxazolidones by the condensation polymerization of polyepoxides with polyisocyanates is described in the patent literature. For example, in U.S. Pat. No. 3,020,262, such a reaction is disclosed in which quaternary ammonium halides are utilized as the catalyst. However, the process is not entirely satisfactory since the polymerization rate is slow as a result of the limited solubility of the catalyst. In U.S. Pat. No. 3,334,110, a method is described in which the reaction rate is increased by the use of an aliphatic alcohol as a co-catalyst with a quaternary ammonium halide.

OBJECTS OF THE INVENTION

It is an object of this invention to provide an improved process for the preparation of polyoxazolidones.

Another object of the invention is to provide an improved catalyst for the polycondensation of a polyepoxide with a polyisocyanate.

Other and further objects and advantages of the invention will become apparent to those skilled in the art upon consideration of the accompanying disclosure.

SUMMARY OF THE INVENTION

Broadly speaking, the process of this invention for preparing polyoxazolidones comprises reacting a polyepoxide with a polyisocyanate in the presence of an organic phosphonium halide as the catalyst. It has been discovered that the catalyst of this invention is more active than the prior art catalysts. Furthermore, the present catalyst is more soluble in the reactants, resulting in a more efficient utilization of the catalyst since it has been found that only the dissolved portion is effective in catalyzing the polymerization. Any undissolved catalyst accumulates as a sediment in the bottom of the reaction and is thereby wasted since it does not enter into the reaction.

Either mono- or di-phosphonium halides can be used as the catalyst in the process of this invention. The mono- and di-phosphonium halides can be represented, respectively, by the following formulas:

$$R'(PR_3X) \text{ and } R''(PR_3X)_2$$

wherein R' is an aliphatic hydrocarbon containing from 1 to 10, inclusive, carbon atoms; R is the same as R' or an aromatic hydrocarbon containing from 6 to 11, inclusive, carbon atoms; R" is a divalent hydrocarbon containing from 1 to 10, inclusive, carbon atoms; and X is a halogen.

In the above formulas, X can be bromine, chlorine, iodine or fluorine. However, primarily for reasons of economy, it is generally preferred that X be bromine or chlorine.

The alphatic hydrocarbon moiety R' can be an alkane, an alkene, an alkyne, a cycloalkane or a cycloalkene, such as $CH_3—$, $C_2H_5—$, $C_3H_7—$, $n—C_4H_9—$, $i—C_4H_9—$, $n—C_6H_{13}—$, $i—C_8H_{17}—$, $H_2C=CHCH_2—$ $CH_3CH=CHCH_2—$, $HC \equiv CCH_2—$, $CH_3C \equiv CCH_2—$ $C_6H_5CH_2—$, $C_6H_5CH_2CH_2—$, $C_6H_{11}—$, $C_6H_9—$, and the like. For reasons of economy and reactivity, it is preferred that R' contain from 1 to 4, inclusive, carbon atoms.

As mentioned above, R can be the same as R' or it can be an aromatic hydrocarbon. Examples of aromatic hydrocarbons include $C_6H_5—$, $CH_3—C_6H_4—$, $o—(CH_3)_2C_6H_3—$ $m—(CH_3)_2C_6H_3—$, $p—(CH_3)_2—C_6H_3—$, $1,2,4—(CH_3)_3C_6H_2—$, $1,3,5—(CH_3)_3C_6H_2—$ $C_3H_7C_6H_4—$, $C_3H_7—C_6H_4—$, and the like.

Examples of the divalent hydrocarbon moiety R" include $—CH_2—$, $—CH_2CH_2—$, $—CH_2CH_2CH_2—$, $—CH_2CH_2CH_2CH_2—$, $—CH_2CH=CHCH_2$, $—(CH_2)_8—$, $$—CH_2CH=\overset{CH_3}{\underset{|}{C}}HCH_2—$$

$—CH_2CH_2CH_2—O—CH_2CH_2CH_2—$, $—H_2CC_6H_4CH_2—$, $—H_2CC_6H_{10}CH_2—$, $—H_2CCH_2C_6H_4CH_2CH_2—$ $—CH_2CH_2—S—CH_2CH_2—$, and the like.

The mono- and diphosphonium halides can also be represented by the following generic formula:

$$Y(PR_3X)_n$$

wherein R and X are as defined above, n is 1 or 2, and, when n is 1, Y is R' and, when n is 2, Y is R", R' and R" also being as above-defined.

The phosphonium halide catalysts of this invention can be synthesized by well-known procedures, involving the quaternization of a phosphine with an organic halide. The following equation illustrates the preparation of a monophosphonium halide.

$$R'X + R_3P \rightarrow R_3PR'X \qquad (1)$$

The following equations are typical examples of the preparation of specific monophosphonium halides:

$$n\text{-}C_4H_9Cl + (n\text{-}C_4H_9)_3P \rightarrow (n\text{-}C_4H_9)_4PCl \quad (2)$$

$$C_2H_5Br + (C_6H_5)_3P \rightarrow (C_6H_5)_3P(C_2H_5)Br \quad (3)$$

The following equations illustrate the preparation of a diphosphonium halide:

$$R''X_2 + 2R_3P \rightarrow R''(PR_3X)_2 \quad (4)$$

or $$2RX + R''(R_2P)_2 \rightarrow R''(PR_3X)_2 \quad (5)$$

The following equations are typical examples of the preparation of a specific diphosphonium halide according to Equations 4 and 5, respectively:

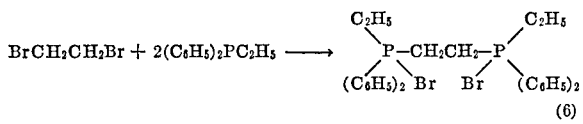

(6)

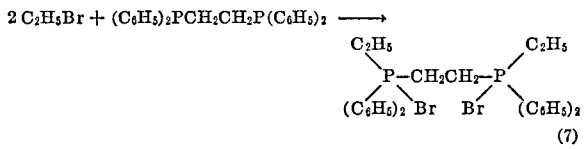

(7)

The following equation illustrates the preparation of another diphosphonium halide, namely, O-xylenebis- (triphenylphosphonium bromide) as well as its corresponding para-isomer in which the reaction is similar to that of Equations 5 and 7:

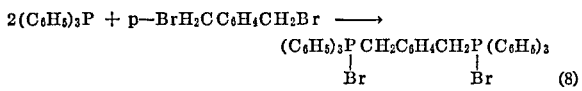

The phosphonium halide catalysts of this invention are commercially available products, or they can be readily synthesized by one skilled in the art according to the above-illustrated procedures. Examples of other phosphonium halides suitable for use in the practice of this invention include $(C_2H_5)_4PBr$;

$(C_2H_5)_4PCl$; $(C_3H_7)_4PI$; $(C_4H_9)_4PBr$; $(CH_2=CHCH_2)$
$(C_4H_9)_3PBr$; $(CH_2=CHCH_2)(C_6H_5)_3PBr$
$(CH_2=CHCH_2)(C_6H_5)_3PCl$; $(C_8H_{17})_3(C_2H_5)PBr$
$C_2H_5(p\text{-}CH_3C_6H_4)PBr$

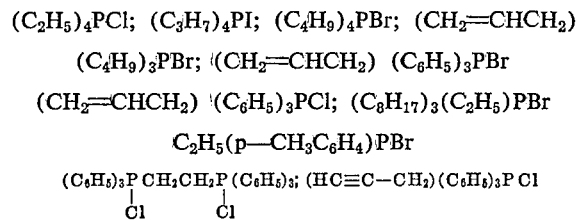

and the like.

The amount of catalyst used in the process of this invention depends at least to some degree upon the particular polyisocyanate used and the temperature of reaction as well as upon whether a solvent or diluent is employed. Thus, the amount of catalyst utilized can vary over a relatively wide range as from about 0.01 to 10 weight percent of the epoxide and isocyanate reactants. It is generally preferred to use from about 0.1 to 5 weight percent catalyst with about 2 weight percent often being the more desirable upper limit.

The polyepoxides used in the present process are compounds that contain at least two oxirane groups,

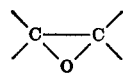

However, it is usually preferred to employ the diepoxides since they are the most commercially available of the epoxides. Furthermore, they can be readily synthesized and are lower in cost than the higher polyepoxides. The epoxides can be saturated or unsaturated, aliphatic, cycloaliphatic, aromatic and heterocyclic. Examples of classes of polyepoxides and specific polyepoxides that can be used in the practice of this invention are disclosed in U.S. Patent, 3,334,110, issued to Charles H. Schramm on Aug. 1, 1967, the disclosure of which is incorporated herein by reference.

Examples of still other diepoxides include resorcinol diglycidyl ether, synthesized by the reaction of resorcinol with epichlorohydrin in the presence of sodium hydroxide; the diglycidyl ether of $N,N_2$-di(p-hydroxyphenyl) isophthalimide, synthesized by the reaction of the phenolic amide, $m\text{-}C_6H_4(CONHC_6H_4OH\text{-}p)_2$, with epichlorohydrin in the presence of triethylamine; and 4,4'-(diphenylmethylene)-diphenylglycidyl ether, synthesized by the reaction of 4,4'-(diphenylmethylene)-diphenol with epichlorohydrin in the presence of sodium hydroxide. Another example of a polyepoxide in which the number of oxirane groups is greater than 2 is an epoxy novolac resin (Dow Chemical Company's DEN–438) represented by the following formula

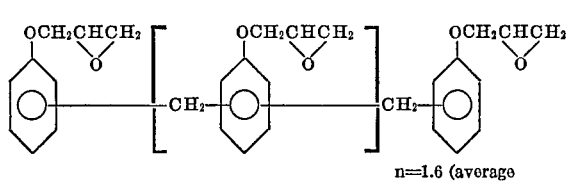

n=1.6 (average)

which is a mixture of approximately 40 percent tri- and 60 percent tetraepoxides. Examples of heterocyclic epoxides are N,N'-di(2,3-epoxypropyl) pyromellitic diimide, synthesized by the reaction of N,N'-diallyl pyromellitic diimide and peroxytrifluoroacetic acid in methylene chloride; and N,N'-di(2,3-epoxypropyl)-1,4,5,8-naphthalenecarboxylic acid diimide, synthesized by the epoxidation of N,N'-diallylnaphthalene - 1,4,5,8 - tetracarboxylic diimide with peroxytrifluoroacetic acid.

The polyisocyanates that can be used in the practice of the process of this invention can be represented by the formula $R(NCO)_x$, wherein $x$ is an integer equal to 2 or more and R is an alkylene, substituted alkylene, arylene or substituted arylene radical, a hydrocarbon or substituted hydrocarbon containing one or more aryl—NCO bonds and one or more alkyl—NCO bonds. R may also include radicals such as —RZR where Z can be a divalent moiety such as —O—, —O—R—O, —CO—, —CO$_2$—, —S—, —S—R—S, —SO$_2$—, and the like. Exemplary compounds include hexamethylene diisocyanate, xylylene diisocyanates, 1-methyl-2,4-diisocyanatocyclohexane, phenylene diisocyanates, toluene diisocyanates, chlorophenylene diisocyanates, polyhalophenylene diisocyanates, diphenylmethene - 4,4'-diisocyanate, naphthalene-1,5-diisocyanate, triphenylmethane-4,4',4''-triisocyanate, isopropylbenzene-d,4-diisocyanate, and the like.

It is also within the purview of the invention to use as the polyisocyanate reactant dimers and trimers of isocyanates and diisocyanates and polymeric diisocyanates of the general formulas $(RNCO)_x$ and $[R(NCO)_x]_y$ wherein $x$ and $y$ are 2 or more. Included also among the polyisocyanate reactants are compounds of the general formula $(M(NCO))_x$, wherein $x$ is 2 or more and M is a mono- or polyfunctional atom or group. Examples of this type of monomers include ethylphosphonic diisocyanate, phenylphosphonic diisocyanate, isocyanates derived from sulfonamides, $R(SO_2NCO)_x$, and the like. An example of a polymeric isocyanate that is especially useful is poly-(methylenephenylisocyanate) obtained by the phosgenation of the reaction product of aniline and formaldehyde.

NCO-terminated prepolymers can also be employed as the polyisocyanate reactant in the present process. A variety of prepolymers are available from commercial sources, usually in the form of viscous oils and having a molecular weight in the range of about 500 to 7500. The prepolymers are usually prepared by reacting a polyether polyol, obtained by the condensation of a polyhydric alcohol with ethylene and/or propylene oxide, with a diisocyanate so as to obtain a urethane having free NCO groups. Depending upon the particular polyol used, i.e., a diol, triol, tetrol, etc., diisocyanate, triisocyanate, or tetraisocyanate prepolymers are obtained. For example, when the condensate of trimethylolpropane and propylene oxide is reacted with isomeric toluene diisocyanate in an amount such that the NCO to OH ratio is greater than 1, a triisocyanate having the formula

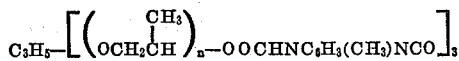

is obtained.

The ratio of polyepoxide to polyisocyanate is expressed as a ratio of epoxide groups to isocyanate groups. A large excess of epoxide groups over isocyanate groups or vice versa tends to limit propagation and lower the molecular weight of the product. At equal molar ratio of isocyanate groups and epoxide groups, the termini of the polymer would consist of one —CNO and one

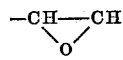

moiety. However, if good adhesion, typical of epoxy polymers is desired, both termini should end in epoxy structures. Thus, the ratio of isocyanate groups to epoxy groups should be in the range of 1:1 to 1:1.3 with a preferred range being 1:1 to 1:1.1.

The temperature at which the process of this invention is conducted can vary within a rather broad range, e.g., at a temperature in the range of about 10 to 200° C. It is usually preferred to operate at a temperature in the range of about 25 to 150° C. The reaction period will depend at least in part upon the reaction temperature, i.e., the higher the temperature the shorter the reaction time. In general, the reaction period is between about 0.10 hours and 5 hours although shorter and longer periods may be used depending upon the reaction temperature and the particular catalyst and reactants employed.

It is usually preferred to carry out the process of this invention in the absence of a solvent. A large number of the polyepoxides are fluid or viscous liquids at room temperature or become very fluid when heated to higher temperatures of the order of 75 to 100° C. Most of the epoxides are good solvents and dissolve the isocyanates without the necessity of a solvent. This a very important and practical advantage since residual solvent is difficult to remove from most polymer compositions. In those cases where a solvent-free homogeneous solution of polyepoxide and polyisocyanate is obtained at room temperature, the catalyst can be added directly to the solution. Alternatively, the catalyst can be added first to the polyepoxide which is then mixed with the isocyanate. In the case where heating is necessary to achieve homogeneity, the catalyst is added to the mixture after it becomes homogeneous, preferably after cooling to a temperature between about 25 and 50° C.

For practical reasons, solventless compositions are greatly preferred, particularly when the products are used for the potting of components, for the production of molded or laminated products, and for adhesives. However, in some cases, the polyepoxides are high melting solids or highly aromatic with poor solvent properties for the polyisocyanates so that a solvent is required. When a solvent is used, its selection will depend on the nature of the polyepoxide as well as the polyisocyanate. The solvent should be non-reactive with the polyepoxide and the polyisocyanate. Aprotic polar solvents can be advantageously used for difficultly soluble reagents. A particularly useful class of such solvents are the normally liquid N, N-dialkylcarboxylamides of which the lower molecular weight species are preferred such as N,N-dimethylformamide and N,N-dimethylacetamide. Examples of other aprotic polar solvents include N,N - diethylacetamide, N,N - dimethylmethoxyacetamide, N,N - diethylformamide, N - methyl caprolactam, dimethyl sulfoxide, N-methyl - 2 - pyrrolidone, tetramethylurea, pyrimine dimethyl sulfone, hexamethylphosphoramide, tetramethylene sulfone, formamide, N - methylformamide, butyrolactone, N,N,N',N' - tetramethyl - alpha - ethylmalonamide, N,N,N',N' - tetramethylglutaramide, N,N,N',N'-tetramethylsuccinamide, thiobis - (N,N - dimethylacetamide, bis (N,N - dimethylcarbamylmethyl)ether, N,N, N',N' - tetramethylfumaramide, methylsuccinonitrile, 1,2,3 - tricyanopropane, alpha - ethylsuccinonitride, succinonitride, N,N-dimethylcyanoacetamide, N,N-dimethyl-beta - cyano - propionamide, dimethylester of methane disulfonic acid, diethylester of ethane - 1,2 - disulfonic acid, bis - (cyanomethyl) - sulfone, 1,2 - diethocyanopropane, bis - (thiocyanomethyl)ether, beta-triocyanoisobutyronitrile, 5 - hydroxy - 2 - piperidone, 3 - hydroxy-2-pyrrolidone, N - formyl - piperidine, N - formyl-pyrrolidone, 2,2',2,2' - tetra - amino - 5,5' - dimethyl - diphenylmethane, nitronaphthol, dimethylsulfoxide, tetramethylenesulfoxide, pentamethylene sulfone, N.N - bis-(cyanomethyl)formamide, N,N' - diformyl - piperazine, N,N - dimethyl - cyanamide, glyconitrile, hydrocyclonitrile, malonitrile, and N - acetyl - 2 - pyrrolidone. The aforementioned solvents can be used alone, in combinations of solvents, or in combination with poorer solvents, e.g., ketones, such as methyl ethyl ketone, nitroalkanes, such as nitroethane and nitropropane, and the like. It is also within the scope of the invention to include minor amounts of non-solvents, such as benzene, benzonitrile, dioxane, xylene, toluene, and cyclohexane. If it is desired to employ a solvent even though the polyepoxide and polyisocynate are mutually soluble in the absence of solvents, it is preferred to utilize common low cost solvents such as ketones, e.g., acetone, methyl ethyl ketone, isophorone and the like; esters, e.g. ethyl acetate, butyl acetate and the like; glycol ethers, e.g., ethyleneglycoldimethyl ether, ethyleneglycoldiethyl ether and the like; and cyclic ethers, e.g., dioxane, tetrahydrofuran and the like. These solvents can be used alone, in admixture with one another, or in admixture with the other solvents mentioned hereinafter.

Although solvents may not be utilized during the initial phase of the polymerization, their use can be important during a later phase. During the course of the reaction, for example, of a diepoxide and a diisocyanate, there is a progressive increase in the viscosity of the reaction mixture up to a point where gellation and insolubility occur. If it is desired to use the viscous product before gellation. suitable aprotic polar solvents as disclosed above can be added to the reaction mixture when the viscosity approaches that of the gel point. At low viscosities, common solvents, such as ketones, esters, cyclic ethers and the like, can be employed.

In instances where solvents are used, a substantial portion of the solvent should be removed by heating or postheating at temperatures depending upon the boiling point of the solvent or mixture of solvents used. This procedure is feasible in films used as coatings or in thin laminates but not in massive encapsulations or moldings.

The phodsphonium halide catalyst used in the polycondensation is not removed but remains as a part of the polymer composition. As regards the recovery of the polymer product, it can be isolated at the soluble and/or fusible stage and used in this intermediate stage for the fabrication of products after which the polycondensation is continued to the final stage. At high catalyst concentrations, final curing can be achieved at ambient temperature, but the cure can be accelerated by increasing the temperature, e.g., up to about 200° C. At low catalyst concentrations, final curing can be accomplished at temperatures in the range of 50 to 150° C. and, if desired, at temperatures up to 200° C.

The products of this invention can be described as polyoxazolidones (or polyoxazolidinones) containing a multiplicity of 2-oxazolidone repeating units of the following ring structure:

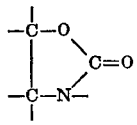

resulting from the cyclo addition of one epoxy group with one isocyanate group. A linear product obtained by the reaction of, for example, a diepoxide with a diisocyanate can be represented by the following equation:

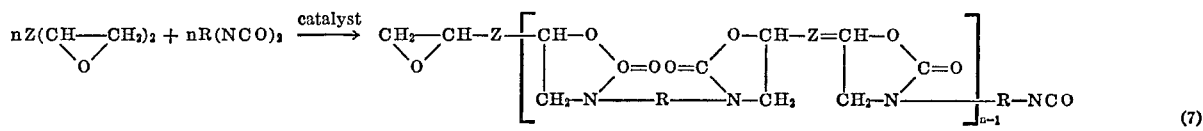

When the epoxide is used in excess, an epoxy-terminated polyoxyzolidone is obtained, for example, according to the following equation:

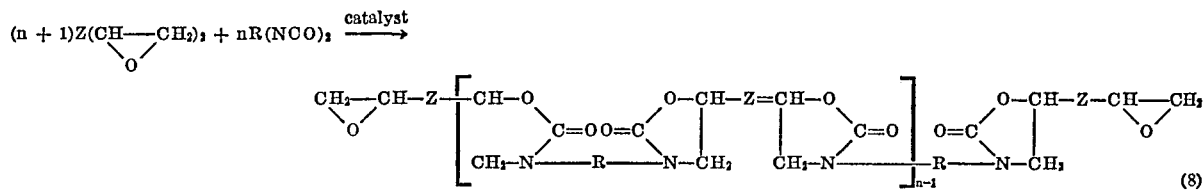

In the foregoing formulas, R is the organic residue of a diisocyanate while Z is a polyvalent aliphatic or aromatic radical. Tri- and tetra-functional epoxides or isocyanates yield repeating units and end groups similar to the products of Equations 7 and 8.

In the case of polymers derived from an equivalent number of epoxide and isocyanate groups, as in Equation 7, curing or continued reaction can occur by the addition of one terminal epoxide group with the terminal isocyanate group. In the polymers represented by Equation 8, further reaction and cross-linking occurs by opening of the terminal epoxy rings.

As mentioned hereinbefore, the polymers can be cured merely by heating. It appears that this is made possible by the presence of residual catalyst in the polymer since cycloaddition between an epoxide group and an isocyanate group does not occur in the absence of a catalyst. Furthermore, an epoxy group does not polymerize readily in the absence of a catalyst or a suitable reactant that will open the epoxy ring. However, in some cases, as for example when the polymer is terminated by epoxy groups, it may be desirable to add compounds which are more effective curing agents than the catalyst of this invention. This procedure is particularly desirable when it is desired to reduce the curing cycle time, as for example when preparing laminates or molded products. In this case curing agents or hardeners conventionally employed for epoxy compounds can be used. These conventional curing agents include amines, acids, acid anhydrides and phenols, such as aniline, ethylene diamine, hexamethylenediamine; maleic acid, malonic acid, phthalic acid and anhydrides thereof; trimethylolphenol, hydroquinone, and the like.

The polymer products obtained by the process of this invention have a wide range of applications. For example, they can be used as coatings, castings, molding compositions, adhesives, filament winding, sealant and caulking compounds, potting compounds, impregnating compounds, and the like. Since the finally cured polymers are condensation can be interrupted at an intermediate stage for whatever use is desired, such as filament winding, coating, impregnation or potting, after which the polymer product is cured to its insoluble state. Also, while in the fluid, soluble stage, the polymer can be mixed with additional unpolymerized epoxide, alone or with curing agents, to increase its adhesive properties. Furthermore, in the fluid or fusible stage, the polymer can be combined with other polymers, such as the soluble, fusible phenol-formaldehyde polymers or compounded with fillers for the preparation of molding compounds. Still further, the fluid polymers can be admixed with polyols, such as ethylene glycol, polypropylene glycol, pentaerythritol, and the like, to provide a polymerizable composition.

For encapsulations and potting, the intermediate condensation product should be used at a viscosity which will allow penetration into the crevices, openings and pores of the part or instrument to be encapsulated. Since insoluble in most solvents, for their end use, they are utilized or applied in their intermediate soluble and/or fusible stage. Their insolubility in their final stage is a valuable characteristic of the polymers. Thus, the poly- the lowest viscosity is found in the initial mixture of polyepoxide, polyisocyanate and catalyst, normally this mixture is poured over the part placed in a container which can be evacuated to eliminate air or other gases which would cause bubbling. After degassing, polymerization and curing can be carried out either at room temperature or at an elevated temperature, depending on the catalyst concentration and the nature of the epoxide and isocyanate.

For molding compositions, the intermediate polymer can be compounded with lubricants, and pigments and especially with fillers, e.g., organic fillers, such as wood flour, alpha flock, cotton fibers, rayon fibers, and the like. Inorganic fillers, such as short glass fibers, mica, silica, alumina and the like, are particularly useful since they contribute heat distortion properties to the composition. The organic fillers can constitute up to about 50 to 55 weight percent of the molding mixture and the inorganic type up to about 70 to 75 weight percent.

A better understanding of the invention can be obtained from a consideration of the following illustrative examples, which are not intended, however, to be unduly limitative of the invention.

EXAMPLE I

A series of runs was conducted in which polyoxazolidones were prepared, using a ratio of one mole of toluene diisocyanate (TDI) with one mole of different epoxides corresponding to two epoxy equivalents as determined by analyses. All of the epoxides were diepoxides that were obtained from commercial sources and with the exception of Shell's Epon–828 they were designated as resins. The weight percent values of epoxy oxygen for the diepoxides along with other information are given below in Table I.

TABLE I

| Diepoxy code | Commercial name | Eq. wt. mole epoxy | Wt. percent epoxy oxygen | Source of resin |
|---|---|---|---|---|
| EP-1 | Ciba Resin CY-179 | 152 | 10.00 | 3,4-epoxycyclohexyl-methyl-3,4,-epoxycyclo-hexanecarboxylate. |
| EP-2 | Ciba Resin RD2 | 133 | 16.00 | 1,4-butanedidiglycidyl ether. |
| EP-3 | Bakelite Epoxy Resin ERL-4206. | 94 | 16.30 | Vinylcyclohexenedioxide. |
| EP-4 | Bakelite Epoxy Resin ERL-4221. | 106 | 14.86 | Cycloaliphatic epoxy. |
| EP-5 | Bakelite Epoxy Resin REL-4205. | 100 | 16.30 | Bis-(2,3-epoxycyclopentyl) ether. |
| EP-6 | Shell Epon-828 | 170 | 9.33 | Bis-phenol-A-diglycidyl ether. |

In carrying out the runs, the reactants were placed in one ounce screw-capped bottles together with 3.7 mg. of ethyl triphenylphosphonium bromide as the catalyst. The bottles were flushed with nitrogen and placed in a 90° C. oven and shaken gently until all of the catalyst dissolved in the mixture. During a period of 2 hours at 90° C., there was a considerable increase in viscosity in all of the reaction mixtures except in the one using EP-5 diepoxide. The temperature was then raised to 190° C. at the rate of 10 degrees per hour and maintained at 190° C. for 4 hours. At the end of the 120° C. period all products were hard except the one using EP-5 diepoxide. However, the latter product was hard at the end of the 130° C. period. All of the polymers were very hard at the end of the heating period. The amounts of diepoxide and TDI used in the runs are shown below in Table II.

TABLE II

| Run Number: | Reactants | Amount, grams | Polymer color |
|---|---|---|---|
| 1 | TDI<br>EP-1 | 1.749<br>3.040 | Deep brown. |
| 2 | TDI<br>EP-2 | 1.745<br>2.660 | Yellow. |
| 3 | TDI<br>EP-3 | 1.758<br>1.880 | Deep orange. |
| 4 | TDI<br>EP-4 | 1.742<br>2.120 | Do. |
| 5 | TDI<br>EP-5 | 1.744<br>2.000 | Dark brown. |
| 6 | TDI<br>EP-6 | 1.775<br>3.415 | Light yellow. |

EXAMPLE II

A series of runs was carried out in which polyoxazolidones were prepared by the polycondensation of synthesized epoxy compounds with TDI in the presence of ethyl triphenylphosphonium bromide as the catalyst. The following diepoxides were employed in the runs and typical preparations are described thereafter:

(1) resorcinol diglycidyl ether,
(2) diglycidyl ether of N,N'-di(p-hydroxyphenyl) isophthalimide, and
(3) 4,4'-(diphenylmethylene)-diphenglycidyl ether.

The first diepoxide was prepared by adding 463.0 g. (4.0 moles) of epichlorohydrin to 55.0 g. (0.5 mole) of resorcinol in a reaction flask fitted with a condenser and calcium chloride tube. The resulting clear brown-orange solution was stirred while slowly adding 44.0 g. (1.1 moles) of NaOH flakes over a 2 hour period while maintaining a temperature of 70 to 80° C. As the base was added a precipitate formed. After addition of all of the base, the solution was stirred for 2 more hours while maintaining a temperature of 65 to 75° C. The mixture was then cooled and filtered. Drying of the precipitate gave 58.7 g. of solid, which compares with a weight of 58.5 g. for the NaCl and excess NaOH expected from the reaction. Testing of the precipitate, which was mostly water soluble, with AgNO₃ and HNO₃ indicated the presence of chloride ions. Testing with phenolphthalein indicated the presence of NaOH. The filtrate was dried over anhydrous MgSO₄ after which excess epichlorohydrin was removed by means of a flash evaporator while maintaining the temperature below 50° C. There was obtained 117.5 g. of a syrupy brown-orange liquid. Analysis for epoxy oxygen gave a value of 12.1 weight percent, equivalent to an epoxy number of 1.68 compared to the calculated values for

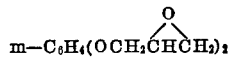

of 14.4 weight percent and 2.0, respectively. Its infrared spectrum indicated strong epoxy peaks at 8.0µ, 11.11µ and 11.90µ and the presence of weak hydroxyl peaks at 3µ. Analysis of the product gave the following percentage values:

Calculated for $C_{12}H_{14}O_4$ (percent): C, 64.85; H, 6.35; O, 28.80. Found (percent): C, 64.12; H, 6.45; O, 29.49.

The second diepoxide was prepared by refluxing a phenolic amide for 3 hours in 75 ml. of epichlorohydrin at 110 to 115° C. in the presence of 2.8 ml. (0.02 mole) of triethylamine. [The phenol amide used was synthesized by the melt reaction of diphenyl isophthalate with p-aminophenol and had the following formula

The resulting solution was then concentrated by distillation to about half of its volume at which a solid separated from the epichlorohydrin. The solid was removed by filtration and dried in a vacuum oven. It showed an epoxy number of 1.52 compared to a theoretical value of 2.0. The solid was successively washed with water and acetone and then dried. The epoxy number was found to be 1.81. Further washing increased the epoxy number to 1.85. Its infrared spectrum showed bands in the region of 8.02µ, 11.11µ and 11.92µ characteristic of the epoxy structure. Analysis of the product gave the following percentage values:

Calculated for $C_{26}H_{24}N_2O_6$ (percent): C, 67.82; H, 5.25; N, 6.08; O, 20.85. Found (percent): C, 65.39; H, 5.85; N, 6.00; O, 22.25.

The third diepoxide was prepared by adding 32 ml. (38.5 g., 0.42 mole) of epichlorohydrin to 2.0012 g. (0.0056 mole) of 4,4' - (diphenylmethylene)-diphenol, forming a clear solution. To this solution there was added with stirring 0.4480 g. (0.0112 mole) of NaOH flakes and with the mixture heated at 75.78° C. During the course of the reaction, a fine precipitate formed that increased with time and then decreased, leaving a pale yellow, cloudy solution containing a very fine precipitate. At the end of 24 hours, the reaction was terminated, and the mixture was centrifuged to remove the suspended matter. The white residue obtained by centrifuging was washed twice with 10 ml. portions of epichlorohydrin which was added to the initial decantate. The white residue was dried, yielding 0.6430 g. of crystalline product which compared to 0.655 of NaCl expected from the reactant. The white precipitate was soluble in water and gave a strong chloride ion test when tested with AgNo₃—HNO₃ reagent. The epichlorohydrin decantate was concentrated at 15 mm. Hg pressure, leaving 3.3106 g. of a pale yellow waxy solid which was washed with 3 ml. portions of distilled water to remove excess base and chlorides. The first washing gave a strong chloride ion test and had a pH of 6.5. The washed precipitate was dried in a vacuum oven at 40° C., yielding a 2.5280 g. (96% of theory, 2.64 g.) of a product having a melting point range of 147 to 166° C., an epoxy content of 6.65 weight percent, and epoxy number of 1.93 (theoretical epoxy content 6.9 percent and epoxy number of 2.0). The infrared spectrum of the product indicated the absence of —OH peaks in the 3.0μ region. Strong epoxy peaks appeared at the 8.02μ, 11.10μ and 11.90μ regions, and ether peaks, —C₆H₄OCH₂ appeared in the 9.75μ and 7.8μ regions. Analysis of the product gave the following percentage values:

Calculated for $C_{31}H_{28}O_4$ (percent): C, 80.15; H, 6.08; O, 13.28. Found (percent): C, 79.89; H, 6.36; O, 14.81.

The polymerizations were performed in essentially the same manner as in Example I, using a ratio of one mole of TDI with one mole of the epoxide corresponding to 2 epoxy equivalents as determined by analysis. The amounts of reactants and catalyst used are set forth below in Table III.

about 10 ml. of dimethylacetamide (DMAC) to the mixture to obtain a homogeneous mixture at 100° C. The solution in these runs was allowed to cool to about 50° C. before adding the catalyst. The polymerization heating cycle for runs 2 to 5 was 2 hours at 130° C. after which the temperature was increased at 10° C. per hour until the temperature reached 190° C. The temperature was maintained at 190° C. for 2 hours. After 2 hours at 130-C., the polymerizations were performed in open vials to permit most of the DMAC to escape. Since TGA tracings of samples of the castings showed that most, but not all, of the DMAC had been eliminated, the polymers were powdered and dried at 170° C. in a drying pistol for 18 hours at 1 mm. Hg pressure.

EXAMPLE III

Thermogravimetric analyses of the polymers prepared in Examples I and II were performed in a duPont 950 thermogravimetric analyzer. The samples of polymer were ground to a fine powder of about 500 particles per 10 mg. The sample weight used was 10 mg., the heating rate was 10° C. per minute, and the gas flow was one standard liter per minute. The data for the polymers prepared

TABLE III

| Run No. | Reactants | Amount, g. | Catalyst, mg. | Polymer color |
|---|---|---|---|---|
| 1 | TDI<br>m—C₆H₄(OCH₂CHCH₂)₂ O | 1.744<br>¹ 2.660 | 3.75 | Orange. |
| 2 | TDI<br>C₆H₄(CONHC₆H₄OCH₂CHCH₂)₂ O | 0.350<br>² 1.160 | 0.75 | Dark brown. |
| 3 | TDI<br>(C₆H₅)₂C(C₆H₄OCH₂CHCH₂)₂ O | 0.175<br>³ 0.776 | 0.375 | Orange. |
| 4 | TDI<br>(C₆H₅)₂C(C₆H₄OCH₂CHCH₂)₂ O | 0.175<br>³ 0.480 | 0.375 | Yellow. |
| 5 | TDI<br>(C₆H₄(CONHC₆H₄OCH₂CHCH₂)₂ O | 0.175<br>² 0.4966 | 0.375 | Brown. |

¹ Resorcinol diglycidyl ether.
² Diglycidyl ether of N,N'-di(p-hydroxyphenyl)isophthalimide.
³ 4,4'-(diphenylmethylene)-diphenylglycidyl ether.

In carrying out runs 2 to 5, the high melting points and the bulk of the epoxides used necessitated the addition of in Examples I and II are shown below in Tables IV and V, respectively.

TABLE IV

| | Inflection temp.,° C. | Atmosphere | Percent weight loss at ° C. | | | | |
|---|---|---|---|---|---|---|---|
| | | | 200 | 300 | 400 | 500 | 600 |
| Run Number: | | | | | | | |
| 1 | 275 | Nitrogen | 0.0 | 5.3 | 23.2 | 55.1 | 80.2 |
| 2 | 325 | do | 0.0 | 2.0 | 11.9 | 56.0 | 71.1 |
| 3 | 250 | d | 0.0 | 3.2 | 28.1 | 71.0 | 86.2 |
| 4 | 250 | do | 0.0 | 10.3 | 32.2 | 59.0 | 89.7 |
| 5 | 225 | do | 1.0 | 12.2 | 24.2 | 60.0 | 78.1 |
| 6 | 325 | do | 0.0 | 1.0 | 18.3 | 76.0 | 80.2 |
| 1 | 230 | Air | 0.0 | 16.1 | 42.8 | 70.0 | 84.7 |
| 2 | 270 | Air | 0.0 | 3.9 | 39.2 | 61.7 | 87.2 |
| 3 | 225 | Air | 2.0 | 11.4 | 41.4 | 62.5 | 90.6 |
| 4 | 220 | Air | 0.9 | 18.2 | 37.5 | 62.5 | 79.8 |
| 5 | 117 | Air | 6.7 | 18.2 | 45.1 | 60.5 | 82.6 |
| 6 | 250 | Air | 0.0 | 8.0 | 40.0 | 73.0 | 90.0 |

TABLE V

| Run number | Inflection temp., °C. | Atmosphere | Percent weight loss at °C. | | | | |
|---|---|---|---|---|---|---|---|
| | | | 200 | 300 | 400 | 500 | 600 |
| 1 | 350 | Nitrogen | 0.0 | 1.0 | 9.0 | 73.7 | 78.7 |
| 2 | 275 | do | 0.0 | 3.5 | 13.8 | 44.3 | 51.9 |
| 3 | 315 | do | 0.0 | 2.4 | 14.4 | 66.3 | 70.7 |
| 4 | 340 | do | 0.0 | 0.0 | 20.0 | 49.1 | 51.0 |
| 5 | 315 | do | 0.0 | 0.0 | 8.7 | 29.1 | 36.0 |
| 1 | 325 | Air | 0.0 | 1.2 | 19.7 | 51.8 | 87.6 |
| 2 | 250 | Air | 0.0 | 1.0 | 14.5 | 50.6 | 87.2 |
| 3 | 255 | Air | 0.0 | 5.2 | 37.3 | 70.2 | 87.5 |
| 4 | 285 | Air | 0.0 | 1.6 | 20.8 | 54.3 | 83.0 |
| 5 | 295 | Air | 0.0 | 1.1 | 17.6 | 59.0 | 80.9 |

The data in the foregoing tables indicate that the polyoxazolidones are thermally stable at elevated temperatures.

EXAMPLE IV

In order to demonstrate the utility of the polyoxazolidones as an adhesive, a thin layer of the viscous intermediate of Run 6 of Example I obtained after 30 minutes reaction at 90° C. was spread between overlapping clean glass slides. The slides, after being heated at 120° C. for 5 hours, adhered tenaciously to each other.

EXAMPLE V

A series of runs is conducted in which polyoxazolidones are prepared by condensing polyepoxides and polyisocyanates in the presence of a catalytic amount of an organic phosphonium halide. The procedure followed in the runs is substantially the same as that described in Example I. The different reactants and catalysts are listed below in Table VI.

TABLE VI

| Run No. | Epoxide | Isocyanate | Catalyst |
|---|---|---|---|
| 1 | N,N'-di(2,3-epoxypropyl)pyromellitic diimide | Hexamethylene diisocyanate | $(C_2H_5)_4PCl$ |
| 2 | 3,4-epoxycyclohexyl-3,4-epoxycyclohexanecarboxylate | 1,5-napthalene diisocyanate | $(CH_2=CHCH_2)(C_4H_9)_3PBr$ |
| 3 | Bis(3,4-epoxycyclohexylmethyl)terephthalate | p-Phenylene diisocyanate | $(C_3H_7)_4PI$ |
| 4 | Triethylene glycol bis(3,4-epoxycyclohexanecarboxylate) | 1,5 napththalene diisocyanate | $(C_8H_{17})_3(C_2H_5)PBr$ |

As will be evident to those skilled in the art, various modifications of this invention can be made or followed in the light of the foregoing disclosure without departing from the spirit or scope of the invention.

I claim:

1. A process for preparing a polyoxazolidone which comprises reacting a polyepoxide having at least two oxirane groups with a polyisocyanate, the ratio of isocyanate to epoxide groups being in the range of 1:1 to 1:1.3, at a temperature in the range of about 10 to 200° C. and in the presence of about 0.01 to 10 weight percent of the polyepoxide and the polyisocyanate of an organic phosphonium halide having the following formula: $Y(PR_3X)_n$ in which $n$ is 1 or 2; X is a halogen atom; R is selected from the group consisting of (1) an aliphatic hydrocarbon containing from 1 to 10, inclusive, carbon atoms and (2) an aromatic hydrocarbon containing from 6 to 10, inclusive, carbon atoms; when $n$ equals 1, Y is an aliphatic hydrocarbon containing from 1 to 10, inclusive, carbon atoms; and, when $n$ equals 2, Y is a divalent hydrocarbon containing from 1 to 10, inclusive, carbon atoms.

2. A process according to claim 1 in which $n$ is equal to 1; X is Br or Cl; R is an aliphatic hydrocarbon containing 1 to 10, inclusive, carbon atoms; and Y is an aliphatic hydrocarbon containing 1 to 10, inclusive, carbon atoms.

3. A process according to claim 1 in which $n$ is equal to 1; X is Br or Cl; R is an aromatic hydrocarbon containing 6 to 10, inclusive, carbon atoms; and Y is an aliphatic hydrocarbon containing 1 to 10, inclusive, carbon atoms.

4. A process according to claim 1 in which $n$ is equal to 2; X is Br or Cl; R is an aliphatic hydrocarbon containing 1 to 10, inclusive, carbon atoms; and Y is a divalent hydrocarbon containing 1 to 10, inclusive, carbon atoms.

5. A process according to claim 1 in which $n$ is equal to 2; X is Br or Cl; R is an aromatic hydrocarbon containing 6 to 10, inclusive, carbon atoms; and Y is a divalent hydrocarbon containing 1 to 10, inclusive, carbon atoms.

6. A process according to claim 1 in which said polyepoxide and said polyisocyanate are reacted at a temperature in the range of 25 to 150° C.

7. A process according to claim 1 in which said polyepoxide and said polyisocyanate are used in amounts such that the ratio of isocyanate to epoxide groups is in the range of 1:1 to 1:1.3; and in which the amount of said organic phosphonium halide is in the range of about 0.1 to 2.0 weight percent of the amount of said polyepoxides and said polyisocyanate.

8. A process according to claim 1 in which said polyepoxide is a diepoxide, said polyisocyanate is toluene diisocyanate, and said phosphonium halide is ethyl triphenylphosphonium bromide.

9. A process according to claim 1 in which said polyepoxide and said polyisocyanate are reacted in an aprotic polar solvent.

References Cited

UNITED STATES PATENTS

| 2,928,803 | 3/1960 | Belanger et al. | 260—47 X |
| 3,020,262 | 2/1962 | Speranza | 260—47 |
| 3,334,110 | 8/1967 | Schramm | 260—47 X |
| 3,377,406 | 4/1968 | Newey et al. | 260—837 X |
| 3,477,990 | 11/1969 | Dante et al. | 260—47 |

WILLIAM H. SHORT, Primary Examiner

T. L. PERTILLA, Assistant Examiner

U.S. Cl. X.R.

260—47 EC, 51 EP, 77.5 NC, 77.5 AM, 307 A